(No Model.)　　　　　　　F. H. RICHARDS.　　　4 Sheets—Sheet 1.
WEIGHING MACHINE.
No. 570,301.　　　　　　　　Patented Oct. 27, 1896.
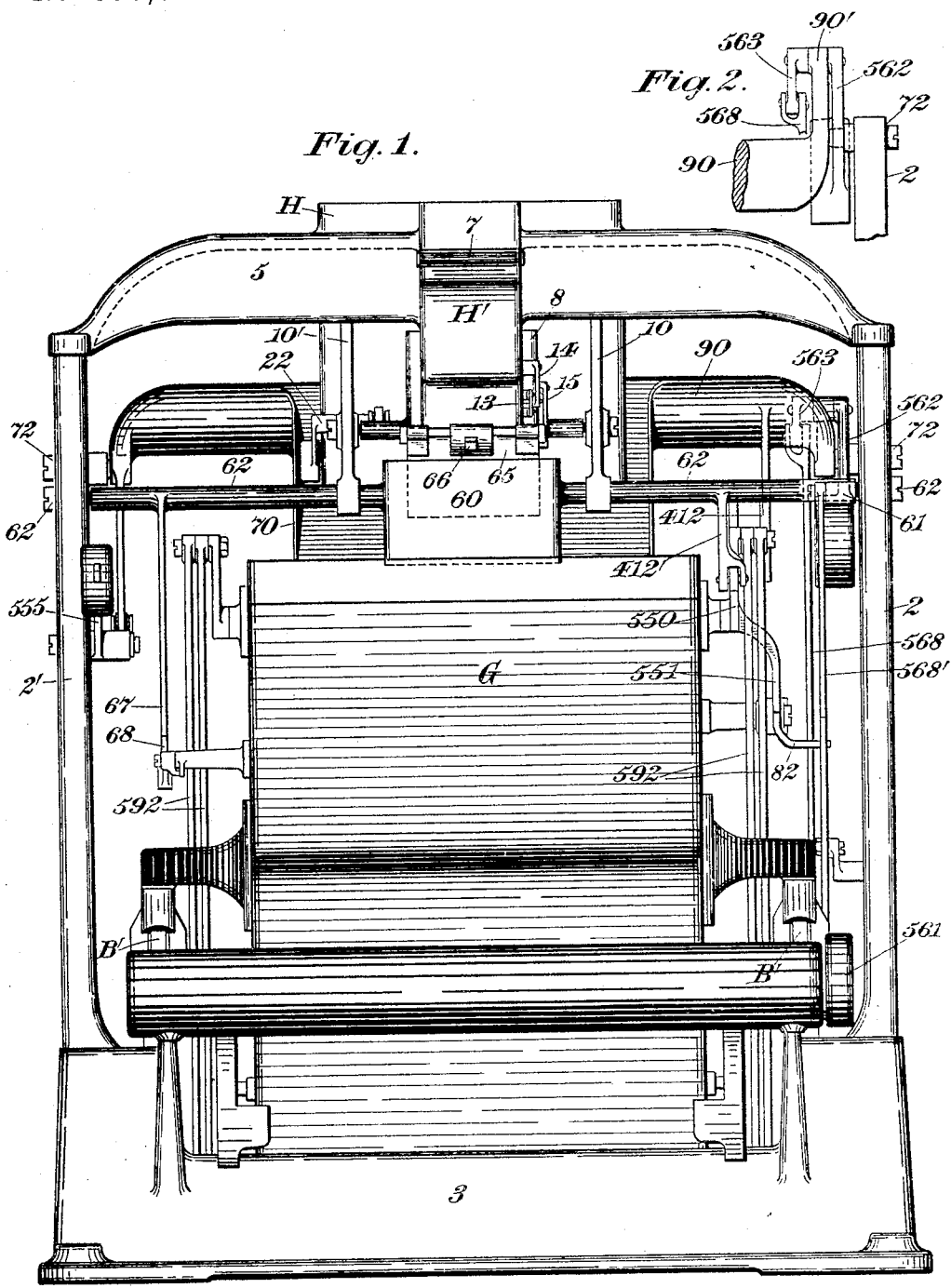
Witnesses:
J. L. Edwards Jr.
Fred. J. Dole.
Inventor:
F. H. Richards.

(No Model.)  F. H. RICHARDS.  4 Sheets—Sheet 2.
WEIGHING MACHINE.

No. 570,301.  Patented Oct. 27, 1896.

Witnesses:
J. L. Edwards, Jr.
Fred. J. Dole.

Inventor:
F. H. Richards.

(No Model.)  F. H. RICHARDS.  4 Sheets—Sheet 3.
WEIGHING MACHINE.

No. 570,301.  Patented Oct. 27, 1896.

Witnesses:  Inventor:

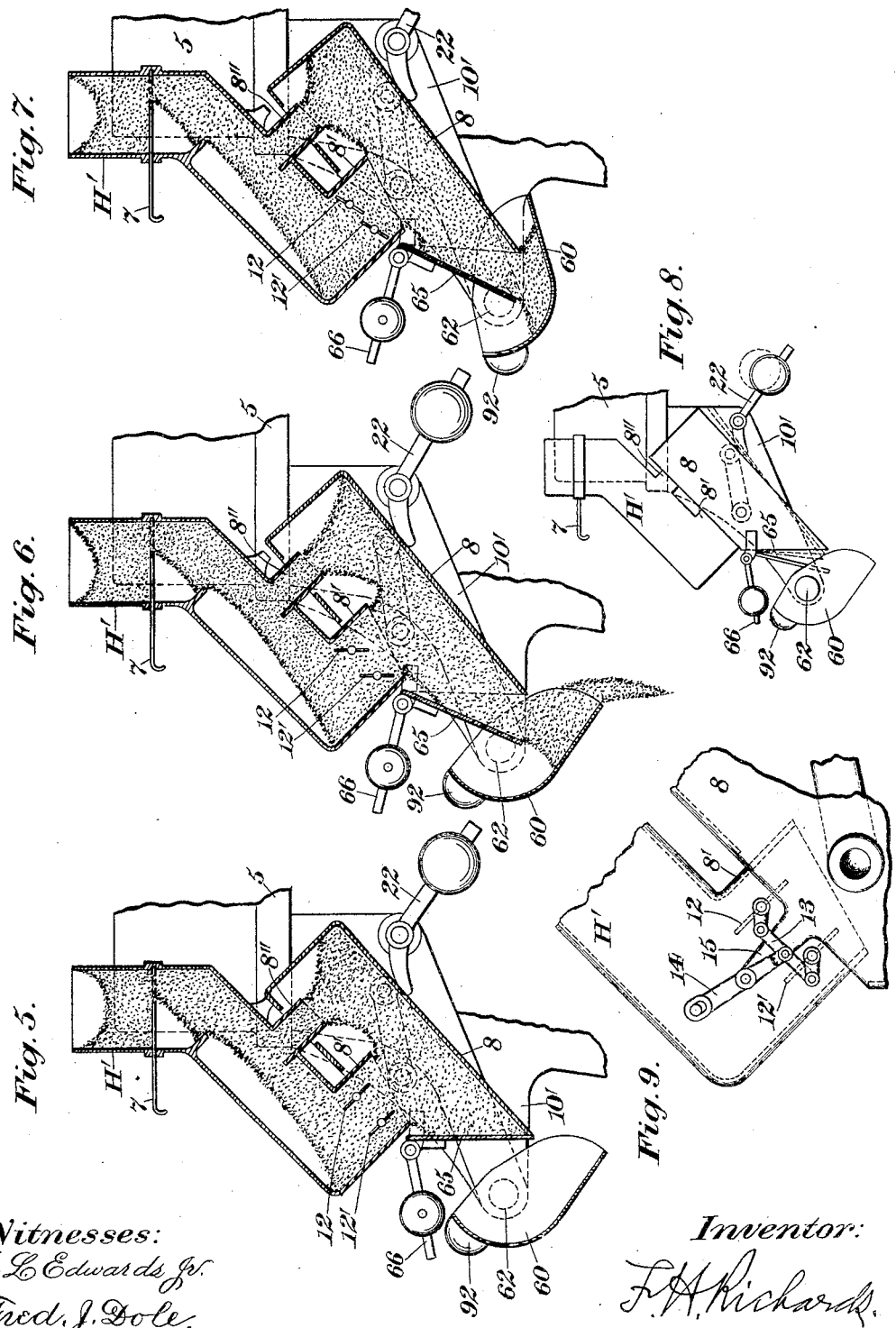

UNITED STATES PATENT OFFICE.

FRANCIS H. RICHARDS, OF HARTFORD, CONNECTICUT.

WEIGHING-MACHINE.

SPECIFICATION forming part of Letters Patent No. 570,301, dated October 27, 1896.

Application filed July 3, 1896. Serial No. 597,966. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to automatic machines adapted for weighing predetermined quantities of grain or other relatively free-flowing materials; and it has for its main object to furnish a machine in which the weighing operation may be effected with greater precision than has been possible in machines of this type heretofore known in the art, this result being accomplished by more perfectly and positively controlling the supply of material to the bucket or load-receiver of the machine, and especially by automatically regulating such supply in accordance with variations in the quality of the material to be weighed.

With reference to one of the main features thereof this invention is in the nature of an improvement upon that shown and described in my application, Serial No. 597,679, filed July 1, 1896, and in which, as in the present application, I have illustrated means for controlling the amount of material supplied to the bucket of the weighing-machine in accordance with variations in the specific gravity or density of the stream flowing through a suitable supply-spout.

Another important object of my invention is to provide improved means for opening the valve, the actuator therefor being so constructed and organized that it may be supported on the valve and carried to its operative position by the action of the beam mechanism, and will be held against operation while the opening movement of the valve is blocked by a suitable stop operative with the load-discharging member of the weighing mechanism.

Figure 3:
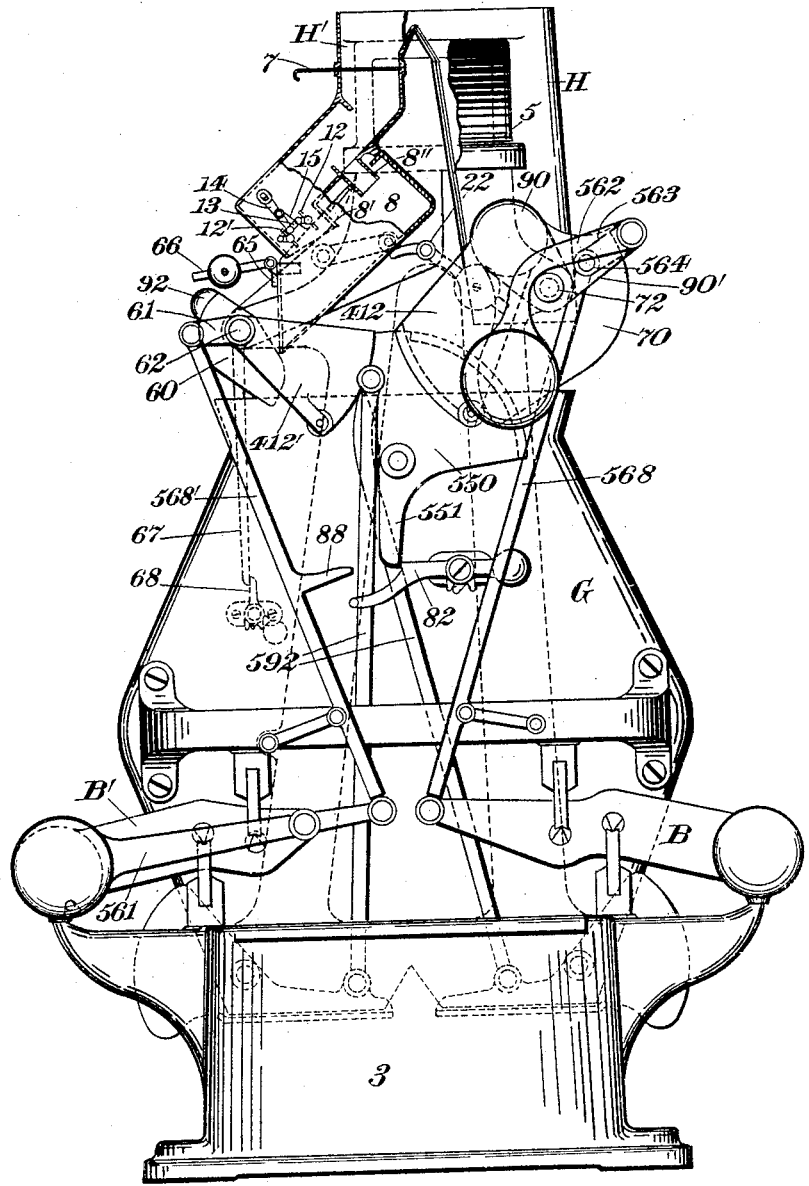
Figure 4:
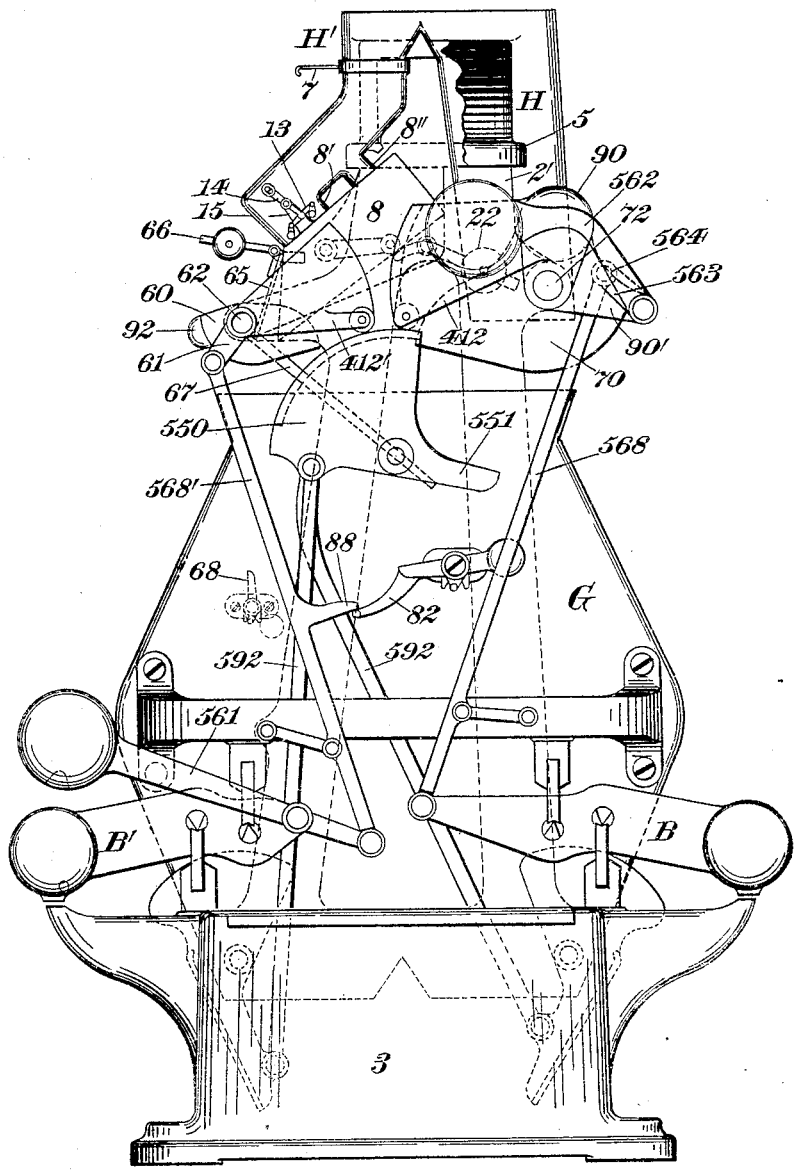

In the drawings accompanying and forming part of this specification, Figure 1 is a front elevation of a weighing-machine embodying my present improvements. Fig. 2 is a detail plan of the valve-opening means shown at the upper right-hand side in Fig. 1. Fig. 3 is a sectional side elevation of said machine, showing the valves open and in position to deliver material to the bucket of the weighing mechanism. Fig. 4 is a corresponding side elevation with parts broken away and illustrating the positions of the several devices when the closer-latch is tripped and the load discharged from the bucket. Figs. 5, 6, and 7 are enlarged sectional detail views of the stream-controlling apparatus for supplying material to the drip-valve of the weighing-machine, illustrating successive steps in the operation of supplying material to said valve and delivering it therefrom. Fig. 8 is a detail side elevation of such drip-stream-controlling devices; and Fig. 9 is a detail, on an enlarged scale, of the means for controlling the action of the oscillatory valves in the branch spout.

Similar characters designate like parts in all the figures of the drawings.

Any suitable framework may be employed for supporting the several operative parts of a weighing-machine embodying my present improvements. That illustrated in the present application is represented comprising a supporting-base 3, preferably chambered, side frames 2 and 2', supported on said base, and a top plate or beam 5, connecting the side frames.

My improved stream-controlling mechanism and valve-actuating means may be employed with any suitable weighing apparatus, but in the present instance I prefer to illustrate the same in connection with a weighing-machine of the "single-chambered" type substantially similar to that shown in Patent No. 548,840, granted to me October 29, 1895, to which reference may be had.

The usual bucket is illustrated at G, and is supported on V-shaped knife-edges carried by beam mechanisms B and B', which in turn are represented pivoted on V-shaped bearings rising from the base 3, all of these parts being of well-known construction.

In the machine shown in my patent just referred to a single chute is represented for supplying material to the valves controlling the stream delivered to the bucket. In the present instance I have represented at H and H' a pair of chutes or supply-spouts, the former of which is adapted to deliver material to the main valve of the weighing mechanism, while the latter is intended to supply a small stream to a drip-valve mounted on an axis separate from the axis of the main valve. Both of these supply-spouts are supported on the top plate or beam 5, and the main spout H is, as will be evident by reference to Fig. 1, much larger than the spout H', and is illustrated coöperating with a valve 70, of correspondingly greater size than the drip-valve which is shown at 60. Each of these valves is substantially similar in construction and mode of operation to the valve shown and described in Patent No. 535,727, granted to me March 12, 1895, the valve 70 being represented having its axis at 72 passing through the stream flowing from the chute or spout H, while the valve 60 is illustrated having its axis at 62 passing through the stream delivered from the discharge end of a stream-chute, such as 8, disposed between the drip-valve and the chute or spout H' in position to control the drip stream delivered to the bucket from the valve 60.

The valve 60 preferably has formed integral therewith a valve-closing counterweight 92, while the valve 70 is shown balanced by means of a counterweight 90, so that the main valve will have no tendency to either open or close.

For the purpose of actuating the drip-valve to open the same, I prefer to employ a valve-opening actuator similar to that shown and described in Patent No. 548,840, hereinbefore mentioned, the drip-valve being represented having a rock-arm 61 pivotally connected with a thrust-rod 568', which bears at its lower end against an antifriction-roll carried at the inner end of a beam-arm or counterweighted lever 561, shiftable from the poising to the counterpoising side of the beam mechanism B', and vice versa. The valve-actuating rod 568' is also illustrated carrying the usual latch-tripper 88, adapted to coöperate with a latch 82 for releasing the closer after the bucket load is completed.

In weighing free-flowing materials—such as wheat and oats—in automatic weighing-machines it is frequently found that the specific gravity or density of the material varies considerably in weighing from the same chamber or bin, owing to the fact that different grades of material are commingled in filling the bin. On delivering this material to the bucket of the weighing-machine, if the size of the valve-opening is maintained constant for the several different grades, the accuracy of the weighing operation is impaired and the loads discharged from the bucket are not uniform in weight, as when the material coming down is heavier than that normally delivered to the machine a considerable excess flows into the bucket before the stream is entirely cut off.

In my application hereinbefore referred to I have shown one means for regulating the stream discharged into the bucket on variations in the weight of the material flowing through the supply-spout. In the present case improved means are represented for controlling the supply of a drip-stream delivered to a drip-valve independently of the flow of the main stream into the main valve, the devices controlling the drip-stream being positioned and organized to check the flow of the drip-stream before it enters the regulating-chamber, and to insure the control of the drip-stream discharged from the drip-valve by variations in only the specific gravity of the material flowing therethrough.

In the present instance the spout H' is illustrated having a check-valve or gate 7, of the usual construction, for regulating the quantity of material to be supplied to the drip-valve. The spout H' is also represented having a main branch spout 8' and a secondary branch spout 8", adapted, respectively, to deliver the drip stream into the stream-chute 8 at longitudinally-separated points in said stream-chute.

The stream-chute 8 is movable on variations in the force or weight of the material flowing therethrough, and is illustrated herein pivoted in a manner to be oscillatory about an axis between its ends and in advance of the rear branch spout 8", so that the discharge end of the stream-chute will travel in a path intersecting the flow line of the stream discharged from the valve, as shown in Figs. 5 to 8, inclusive. This stream-chute is represented supported for oscillation between a pair of depending arms or brackets 10 and 10', extending from the top plate 5, these arms also constituting means for supporting the trunnions 62 of the drip-valve.

The stream-chute 8 is so organized with respect to the supply-spout and the framework as to gravitate on an increase of the weight of the material delivered thereto, and is also reactive, preferably by means of a counterweighted lever 22, supported on the bracket 10', when the specific gravity of the stream is lowered. The discharge end of the stream-chute is controlled in this instance by a check plate or valve 65, which is shown hinged to the forward upper side of said stream-chute, and having a counterweighted lever 66 for normally holding said valve 65 closed until the box or chamber 8, constituting the stream-chute, is full of material, when the weight of the mass will force the check-valve open and permit the stream to be delivered through the drip-valve into the bucket.

It will be noticed that the two branch spouts 8' and 8" dip into the box 8, so that when the stream-chute descends the material issuing from such branch spouts will not flow over the outside of the box 8 and be wasted or vitiate the accuracy of the load.

For the purpose of still further controlling the drip-stream flowing through the spout H', I prefer to provide stream-controlling means—such as a pair of oscillatory valves 12 and 12'—in the branch spout 8', for regulating the amount of material permitted to pass through such branch spout, these valves being connected, as by means of a suitable link 13, to a lever 14, loosely pivoted on the side of the drip-chute and operative by means of an arm 15, fixed on the stream-chute 8. As said stream-chute rises and falls, the valves 12 and 12' will be actuated thereby, the branch spout 8' being opened wide when the material coming down is of low specific gravity, while when such material increases in weight the valves 12 will close said main branch spout partially and check the flow of the material therethrough. It will be noticed, however, that the spout 8'' is always open to maintain communication uninterrupted between the drip-spout and the rear end of the stream-chute, and hence it will be evident that the box 8 will at all times be kept full of material if a stream is flowing down through the spout H'.

It will be apparent from the foregoing that as the stream-chute moves from the position shown in full lines to that illustrated in dotted lines in Fig. 8 it will travel in a path intersecting the flow line of the drip stream pouring over the end of the drip-valve 60, and will either increase or decrease the depth of such drip stream according to the direction in which the chamber 8 oscillates, and also proportionally to the variations in the force or weight of the material flowing through the stream-chute, as indicated by the movements of the same.

It will be obvious that if the stream is made up of very light material the stream-chute will be in the position shown in Fig. 5, and will, when the check-valve is opened, permit the material to be discharged from the drip-valve through a large drip-opening, while if the mass of material is of high specific gravity the drip-opening will be relatively small.

I prefer to maintain the valve 60 wide open during the major portion of the reducing period when the drip stream is flowing into the bucket, and hence I have illustrated at 67 a lever carried for movement in unison with the drip-valve and adapted to be engaged by a by-pass stop 68, carried on one side of the bucket in such a position that when the drip-valve is opened, immediately after a load is discharged from the bucket and the closer is shut, the said lever will pass by such stop, but on the descent of the bucket, during the early part of the making up of the load, will be held by the stop until the full load is completed, when the lever will be released and will move from the position shown in Fig. 3 to that indicated in Fig. 4, the force of the counterweight being sufficient to close said valve.

I have illustrated in the present case interlocking devices for controlling the movements of the valves and of the load-discharging member or closer in a manner substantially similar to that represented in my patent first hereinbefore referred to. The main valve is shown carrying for movement in unison therewith a stop 412, while a corresponding stop is represented at 412' fixed on the drip-valve 60. A rocker is illustrated at 550 pivoted on one side of the bucket near the receiving end thereof and having pivotal connections with rods 592, secured to the bucket-closers. This rocker is also shown having a projecting arm 551, on the end of which is a detent-face adapted to coöperate with a corresponding stop-face on the closer-latch 82.

While the stop 412 is not represented herein operative to prevent the oscillation of the rocker 550, and hence the opening movement of the closers while the valves are open, the stop 412' is so represented and constitutes a load-discharging-movement limiter or closer-opening-movement limiter for preventing the opening of the closers until the drip-valve is shut. The rocker 550 is illustrated operative in a corresponding manner for preventing the opening movement of the valves while the closers are open, the rocker being effective in this instance for controlling the stops of both the main valve and the drip-valve.

The actuator for controlling the opening of the main valve may be of any usual construction, but in the present case I employ an actuator carried on and movable relatively to said valve, this actuator being preferably loosely oscillatory about a pivot in the rear of the axis of movement of the main valve. Said valve-opening actuator is illustrated herein as a counterweighted lever 562, pivoted at its outer end in an extension 90' of the balance-weight of the main valve, (see Fig. 2,) said lever being shown in fixed relation with a link 563, pivoted at its inner end to a thrust-rod 568, similar to the rod illustrated at 568', both of these thrust-rods being guided in their movements by means of suitable link connections with the framing.

It will be apparent that when the main valve is wide open and delivering a stream of material to the bucket the actuator 562 should rest upon a suitable stop coincident with the axis of the main valve, it being represented herein as stopped against one of the pivot members 72 of said valve. When, however, after a load has been made up in the bucket the closers are opened, the load is discharged, and the bucket rises, it will be obvious that the weight of the beam mechanism will operate to raise the lever from the position shown in Fig. 3 to that illustrated in Fig. 4, whereupon the pivot of the lever will be shifted from the pivot of the main valve to a point substantially coincident with that indicated at 564—that is to say, instead of forming substantially a portion of the valve, as it did in the former position, it becomes effective to oscillate about the pivot 564 and to actuate the valve 70 to open the same when the stop 412 is released from engagement with the rocker 550.

It should be understood that the actuator 562, while of such weight that when in the position shown in Fig. 3 the closing-actuator for the main valve will be effective to overcome the weight of said valve-opening actuator and operate to close the valve, yet when shifted by the ascending scale-beam B to the position shown in Fig. 4 the valve-opening actuator will be adapted to exert a leverage sufficiently increased to overcome the leverage of the valve-closing actuator for the main valve, and will exert its force upon said valve and open the same when the rocker 550 is shifted out of the path of the stop 412 on the shutting of the closers. It will be seen that at this moment the thrust-rod 568 is a rigid abutment, and hence that the lever 562 may drop and force the valve open, the link 563 fixed to said lever turning about the pivot 564 and assuming the position shown in Fig. 3.

The operation of a machine embodying my present improvements, hereinbefore described, is as follows: It being assumed that material is flowing into the spouts H and H', and that the valve mechanisms are in the positions indicated in Fig. 3, material will flow through the main and drip valves until the bucket begins to descend, whereupon the valve-closing actuator 555 will close the main valve 70, this closure being effected at the moment of the beginning of the usual reducing period. If now the specific gravity of the material flowing through the drip-spout varies, the amount of material supplied to the bucket will be properly regulated by the action of the stream-chute 8, and only so much material will be delivered into the bucket as is necessary to make up an exact full load. During the first part of the reducing period the lever 67 will be held by the stop 68, and said lever will not be released until almost the last part of the drip stream has been supplied to the bucket, when the latter will carry the stop 68 down below the end of said lever and permit the counterweight 92 to actuate the drip-valve for cutting off the last part of the stream. Immediately thereafter the latch-tripper 88 will release the latch 82 from the arm 551 of the rocker, and the closers will open to discharge the load from the bucket, whereupon the rocker 550 will become effective to prevent the opening of either valve until the closers are shut again. On the ascent of the bucket the drip-valve actuator 561 is oscillated to the position shown in Fig. 4, owing to the fact that the thrust-rod 568' is then a rigid abutment, and at the same time the valve-opening actuator 562 for the main valve is actuated in a corresponding manner. On the shutting of the closers the rocker 550 will be withdrawn from engagement with the stops 412 and 412', and thereupon the levers 561 and 562 will become effective to actuate their respective valves to open the same and permit the making up of another load in the bucket.

Having described my invention, I claim—

1. The combination with stream-supplying means, of an automatically-operating stream-controlling valve; and a reactive gravitating stream-chute delivering material directly to the valve and movable at its discharge end, proportionally to variations in the force of the stream passing therethrough, in a path intersecting the flow line of the stream discharged from the valve.

2. The combination with stream-supplying means, of an automatically-operating stream-controlling valve; and a reactive gravitating stream-chute delivering material directly to the valve and oscillatory at its discharge end, proportionally to variations in the force of the stream passing therethrough, in a path intersecting the flow line of the stream discharged from the valve.

3. The combination with stream-supplying means, of an automatically-operating stream-controlling valve; and a reactive gravitating stream-chute delivering material directly to the valve and oscillatory at its discharge end about an axis between its ends, proportionally to variations in the force of the stream passing therethrough, in a path intersecting the flow line of the stream discharged from the valve.

4. The combination with stream-supplying means, of an automatically-operating delivery-valve; a reactive gravitating stream-chute movable at its discharge end, proportionally to variations in the force of the stream passing therethrough, in a path intersecting the flow line of the stream discharged from the valve; and a stream-operated reactive check-valve controlling the discharge end of the stream-chute.

5. The combination with stream-supplying means, of an automatically-operating delivery valve; a reactive gravitating stream-chute movable at its discharge end, proportionally to variations in the force of the stream passing therethrough, in a path intersecting the flow line of the stream discharged from the valve; and an oscillatory stream-operated reactive check-valve carried by the stream-chute and controlling the discharge end thereof.

6. The combination with stream-supplying means, of a delivery-valve; a reacting gravitating stream-chute movable at its discharge end, proportionally to variations in the force of the stream passing therethrough, in a path intersecting the flow line of the stream discharged from the valve; and an oscillatory stream-operated counterweighted check-valve carried by the stream-chute and controlling the discharge end thereof.

7. The combination with a pair of supply-spouts, of a reactive gravitating stream-chute in position to receive material from said supply-spouts and movable proportionally to variations in the force of the stream passing through said chute; and chute-operated stream-controlling means for regulating the efflux of material from one of said supply-spouts.

8. The combination with a pair of supply-spouts, of a reactive gravitating stream-chute in position to receive material from said supply-spouts and movable proportionally to variations in the force of the stream passing through said chute; and chute-operated stream-controlling means for reducing and increasing the flow of material from one of said supply-spouts proportionally to the movements of the stream-chute.

9. The combination with a pair of supply-spouts, of a reactive gravitating stream-chute in position to receive material from said supply-spouts and oscillatory about an axis in advance of the rear spout proportionally to variations in the force of the stream passing through said chute; and chute-operated stream-controlling means for regulating the efflux of material from the forward supply-spout.

10. The combination with a pair of supply-spouts, of a reactive gravitating stream-chute in position to receive material from said supply-spouts and movable proportionally to variations in the force of the stream passing through said chute; and a chute-operated valve in one of said supply-spouts for regulating the efflux of material therefrom.

11. The combination with a pair of supply-spouts, of a reactive gravitating stream-chute in position to receive material from said supply-spouts at different points in its length and movable proportionally to variations in the force of the stream passing through said chute.

12. The combination with a pair of supply-spouts, of a reactive gravitating stream-chute in position to receive material from said supply-spouts and oscillatory about an axis in the path of the stream delivered from the forward spout proportionally to variations in the force of the stream passing through said chute.

13. The combination with a pair of supply-spouts, of a delivery-valve at the discharge end of the stream-chute; a reactive gravitating stream-chute movable at its discharge end, proportionally to variations in the force of the stream passing therethrough, in a path intersecting the flow line of the stream discharged from said valve; and an oscillatory stream-operative reactive check-valve between the stream-chute and the delivery-valve and controlling the discharge end of said chute.

14. The combination with an automatic weighing mechanism embodying a bucket, of a main valve; a drip-valve; stream-supplying means; and a reactive gravitating stream-chute movable at its discharge end, proportionally to variations in the force of the stream passing therethrough, in a path intersecting the flow line of the stream discharged from the drip-valve.

15. The combination with an automatic weighing mechanism embodying a bucket, of a main valve; a drip-valve; a pair of supply-spouts, one for each valve; and a reactive gravitating stream-chute between the drip-valve and its spout and movable at its discharge end, proportionally to variations in the force of the stream passing therethrough, in a path intersecting the flow line of the stream discharged from the drip-valve.

16. The combination with an automatic weighing mechanism embodying a shiftable load-discharging member, of a main valve; a drip-valve; a pair of supply-spouts, one for each valve; means for releasing the shiftable member on the completion of a load; a pair of stops operative, respectively, with said respective valves; and valve-stopping means operative with the load-discharging member and in position and adapted for engaging said stops and preventing the opening of the valves while the closer is open.

17. The combination with an automatic weighing mechanism embodying a shiftable load-discharging member, of a main valve; a drip-valve; a pair of supply-spouts, one for each valve; means for releasing the shiftable member on the completion of a load; a pair of stops operative, respectively, with said respective valves; and a valve-opening-movement limiter operative with the load-discharging member and in position and adapted for engaging said stops and preventing the opening movement of the valves while the closer is open.

18. The combination with a main supply-spout, of a pair of branch spouts leading therefrom; and a reactive gravitative tubular stream-chute having openings in its upper side for receiving the delivery ends of the branch spouts and movable proportionally to variations in the force of the stream passing through the chute.

19. The combination with a main supply-spout, of a pair of branch spouts leading therefrom, substantially at right angles thereto, to reduce the force of the supply stream; and a reactive gravitative stream-chute movable proportionally to variations in the weight of the stream passing therethrough.

20. In an automatic weighing-machine, the combination with a chute and with a valve therefor; of a valve-opening actuator carried by, and movable relatively to, the valve.

21. In an automatic weighing-machine, the combination with a chute and a valve therefor; of an oscillatory valve-opening actuator carried by, and movable relatively to, the valve.

22. In an automatic weighing-machine, the combination with a chute and with a valve therefor; of an oscillatory valve-opening actuator pivoted to the valve in the rear of the axis of the valve and oscillatory relatively to said valve.

23. In an automatic weighing-machine, the combination with a shiftable load-discharging member; of a main valve; a drip-valve; a pair of supply-spouts, one for each valve; a reactive gravitative stream-chute between the drip-valve and its spout and movable at its discharge end, proportionally to variations in the force of the stream passing therethrough, in a path intersecting the flow line of the stream discharged from the drip-valve;

valve-actuating means; and reciprocally effective valve-opening-movement and load-discharging-movement limiters operative, respectively, with the load-discharging member and with the drip-valve.

24. In an automatic weighing-machine, the combination with a shiftable load-discharging member; of a main valve; a drip-valve; a pair of supply-spouts, one for each valve; a reactive gravitative stream-chute between the drip-valve and its spout and movable at its discharge end, proportionally to variations in the force of the stream passing therethrough, in a path intersecting the flow line of the stream discharged from the drip-valve; valve-actuating means; and reciprocally effective valve-opening-movement and load-discharging-movement limiters, the former operative with the load-discharging member and controlling both of the valves and the latter operative with the drip-valve.

FRANCIS H. RICHARDS.

Witnesses:
FRED. J. DOLE,
HENRY BISSELL.